United States Patent
Park et al.

(10) Patent No.: US 9,643,474 B2
(45) Date of Patent: May 9, 2017

(54) AIR CONDITIONER FOR VEHICLE

(71) Applicant: HALLA VISTEON CLIMATE CONTROL CORP., Daejeon (KR)

(72) Inventors: Soo Doo Park, Daejeon (KR); Jeong Hun Seo, Daejeon (KR); Sang Ki Lee, Daejeon (KR); Tae Wan Kim, Daejeon (KR); Hwan Myeong Jung, Daejeon (KR)

(73) Assignee: HANON SYSTEMS, Daejeon-Si (KR)

( * ) Notice: Subject to any disclaimer, the term of this patent is extended or adjusted under 35 U.S.C. 154(b) by 440 days.

(21) Appl. No.: 14/343,468

(22) PCT Filed: Sep. 26, 2012

(86) PCT No.: PCT/KR2012/007747
§ 371 (c)(1),
(2) Date: Mar. 7, 2014

(87) PCT Pub. No.: WO2013/048107
PCT Pub. Date: Apr. 4, 2013

(65) Prior Publication Data
US 2014/0190658 A1   Jul. 10, 2014

(30) Foreign Application Priority Data

Sep. 28, 2011 (KR) .................. 10-2011-0097953
Sep. 28, 2011 (KR) .................. 10-2011-0097955
Sep. 26, 2012 (KR) .................. 10-2012-0107021

(51) Int. Cl.
  *B60H 3/02* (2006.01)
(52) U.S. Cl.
  CPC ....... *B60H 3/024* (2013.01); *B60H 2003/028* (2013.01); *F24F 2203/1032* (2013.01)

(58) Field of Classification Search
  CPC  F24F 2203/1032; F24F 3/1423; B60H 3/024; B60H 2003/028
  (Continued)

(56) References Cited

U.S. PATENT DOCUMENTS 4,180,985 A * 1/1980 Northrup, Jr. ......... B01D 53/26
                                                      62/271
4,473,108 A * 9/1984 Jansson .................. F24F 3/1423
                                                      165/78

(Continued)

FOREIGN PATENT DOCUMENTS

DE      19900846 A1    7/1999
JP    2001270326 A    10/2001

(Continued)

*Primary Examiner* — Allana Lewin Bidder
*Assistant Examiner* — Raheena Rehman
(74) *Attorney, Agent, or Firm* — Dickinson Wright PLLC

(57) ABSTRACT

Disclosed therein is an air conditioner for a vehicle, which includes: a bypass passageway formed at a lower portion of an air-conditioning case which bypasses cold air and warm air passageways; a regeneration passageway formed at the lower portion of the air-conditioning case for supplying the air passing through the bypass passageway to a regeneration part of the desiccant rotor; and a heater having one side area arranged on the bypass passageway and the other side area arranged on the warm air passageway. The air conditioner heats the dehumidified air passing through the desiccant part of the desiccant rotor and the bypass passageway by the heater and supplies the heated air to the regeneration part of the desiccant rotor so as to regenerate the desiccant rotor, thereby reducing the number of components and the entire size and enhancing heating performance and increasing an air volume by moving the air, which is heated while passing the bypass passageway through a door mounted in the communication chamber, toward the warm air passageway in a heating mode.

14 Claims, 11 Drawing Sheets

(58) Field of Classification Search
USPC .............................. 165/41, 8, 42; 62/94, 271
See application file for complete search history.

(56) References Cited

U.S. PATENT DOCUMENTS

| | | | | |
|---|---|---|---|---|
| 4,719,761 | A * | 1/1988 | Cromer | F24F 3/1405 62/271 |
| 5,429,180 | A * | 7/1995 | Nishino | A61L 9/12 165/41 |
| 5,509,275 | A * | 4/1996 | Bhatti | B60H 3/024 165/7 |
| 5,878,590 | A | 3/1999 | Kadle et al. | |
| 6,029,462 | A * | 2/2000 | Denniston | B01D 53/06 62/244 |
| 6,205,805 | B1 * | 3/2001 | Takahashi | B60H 3/024 62/271 |
| 6,973,795 | B1 * | 12/2005 | Moffitt | F24F 3/1423 62/132 |
| 7,389,646 | B2 * | 6/2008 | Moffitt | F24F 3/1423 165/222 |
| 8,074,709 | B2 * | 12/2011 | Park | B60H 1/00521 165/202 |
| 8,327,652 | B2 * | 12/2012 | Nakaguro | B60H 3/02 62/244 |
| 2004/0244961 | A1 * | 12/2004 | Han | B60H 1/00028 165/203 |
| 2005/0126774 | A1 * | 6/2005 | Yamaguchi | B60H 1/00021 165/204 |
| 2007/0023181 | A1 * | 2/2007 | Sawamukai | B60H 1/0005 165/202 |
| 2009/0038774 | A1 * | 2/2009 | Ogiso | B60H 1/247 165/42 |
| 2010/0281904 | A1 | 11/2010 | Yokomachi et al. | |
| 2010/0300123 | A1 * | 12/2010 | Park | B01D 53/06 62/94 |
| 2011/0005707 | A1 * | 1/2011 | Seto | B60H 1/00064 165/41 |
| 2011/0005708 | A1 * | 1/2011 | Seto | B60H 1/00064 165/41 |
| 2011/0005709 | A1 * | 1/2011 | Kitamura | B60H 1/00064 165/61 |
| 2011/0005731 | A1 * | 1/2011 | Nanaumi | B60H 1/00028 165/121 |
| 2011/0088880 | A1 * | 4/2011 | Seto | B60H 1/00328 165/151 |
| 2011/0126460 | A1 * | 6/2011 | Bromberg | C10J 3/18 48/87 |
| 2011/0138850 | A1 * | 6/2011 | Suzuki | B60H 1/00328 62/524 |
| 2012/0018119 | A1 * | 1/2012 | Kojima | B60H 1/0065 165/41 |
| 2012/0023988 | A1 * | 2/2012 | Togano | B01D 53/261 62/159 |

FOREIGN PATENT DOCUMENTS

| | | |
|---|---|---|
| JP | 2006232232 A | 9/2006 |
| KR | 20040058912 A | 7/2004 |
| KR | 20110011100 A | 2/2011 |

* cited by examiner

Prior Art

AIR CONDITIONER FOR VEHICLE

CROSS REFERENCE TO RELATED APPLICATIONS

This application is a National phase of International Application No. PCT/KR2012/007747 filed Sep. 26, 2012 which claims priority to Korean Application Nos. 10-2011-0097953 filed Sep. 28, 2011, 10-2011-0097955 filed Sep. 28, 2011 and 10-2012-0107021 filed Sep. 26, 2012. The entire disclosure of each of the above applications is incorporated herein by reference.

BACKGROUND OF THE INVENTION

Field of the Invention

The present invention relates to an air conditioner for a vehicle, and more particularly, to an air conditioner for a vehicle, which includes: a bypass passageway formed at a lower portion of an air-conditioning case which communicates with a desiccant part of a desiccant rotor and bypasses cold air and warm air passageways; a regeneration passageway formed at the lower portion of the air-conditioning case for supplying the air passing through the bypass passageway to a regeneration part of the desiccant rotor; and a heater having one side area arranged on the bypass passageway and the other side area arranged on the warm air passageway, so that the air conditioner heats the dehumidified air passing through the desiccant part of the desiccant rotor and the bypass passageway by the heater and supplies the heated air to the regeneration part of the desiccant rotor so as to regenerate the desiccant rotor.

Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

According to mounted structures of an air blowing device unit, an evaporator unit and a heater core unit, such an air conditioner is classified into a three-piece type air conditioner where the air blowing device unit, the evaporator unit, and the heater core unit are disposed independently, a semi-center type air conditioner where the evaporator unit and the heater core unit are embedded in an air-conditioning case and the air blowing device unit is mounted separately, and a center-mounting type air conditioner where the three units are all embedded in the air-conditioning case.

Recently, an independent type air conditioner, which separately and independently provides air of different temperatures to a driver's seat and to a passenger's seat inside the vehicle to thereby individually heat and cool the seats according to the driver's or the passenger's need, has been disclosed.

FIG. 1 illustrates a conventional air conditioner for a vehicle. In FIG. 1, the air conditioner 1 includes: an air-conditioning case 10 having an air inflow port 11 formed at one side thereof and a defrost vent 12, a face vent 13 and floor vents 14 formed at the other side thereof in such a way as to be adjusted in degree of opening by mode doors 16; an evaporator 2 and a heater core 3 that are mounted on air passageways in the air-conditioning case 10 in order and spaced apart from each other at a predetermined interval; and an air blowing device 20 connected to the air inflow port 11 of the air-conditioning case 10 for sending indoor air or outdoor air.

Moreover, the air conditioner further includes a temperature-adjusting door 15 mounted between the evaporator 2 and the heater core 3 for controlling temperature by adjusting the degree of opening of a cold air passageway bypassing the heater core 3 and of a warm air passageway passing through the heater core 3.

Furthermore, the mode doors 16 control the degree of opening of the relevant vents and carry out various air discharge modes, namely, a vent mode, a bi-level mode, a floor mode, a mix mode, and a defrost mode.

As described above, in the air conditioner 1 for the vehicle, in case of the greatest cooling mode, the temperature-adjusting door 15 opens the cold air passageway and closes the warm air passageway. Therefore, the air blown by the air blowing device 20 heat-exchanges with refrigerant flowing inside the evaporator 2 while passing through the evaporator 2 and is converted into cold air. After that, the converted air is discharged to the inside of the vehicle through the vents opened by the mode doors 16 according to the predetermined air discharge mode namely, the vent mode, the bi-level mode, the floor mode, the mix mode, or the defrost mode, whereby the inside of the vehicle is cooled.

Moreover, in the case of the greatest heating mode, the temperature-adjusting door 15 closes the cold air passageway and opens the warm air passageway. Accordingly, the air blown by the air blowing device 20 passes through the evaporator 2, is converted into warm air by heat-exchanging with cooling water flowing inside the heater core 3 while passing through the heater core 3 through the warm air passageway. After that, the converted air is discharged to the inside of the vehicle through the vents opened by the mode door according to the predetermined air discharge mode, whereby the inside of the vehicle is heated.

In the air conditioner 1, the evaporator 2 cools the inside of the vehicle and provides a humidification action to remove moisture in the air discharged through the evaporator 2 when the surface temperature of the evaporator 2 falls below the dew point of the indoor air.

A cooling load of the evaporator 2 includes a sensible heat load related with a dry bulb temperature difference of the inflow air and a latent heat load related with a humidity difference. When the air conditioner is operated in a state where the outdoor air of high temperature and humidity flows indoors, the latent heat load out of the cooling load occupies most of the indoor space, and hence, the cooling efficiency is greatly lowered.

As described above, when the air conditioner is operated in the weather of high humidity, the air conditioner 1 is deteriorated in cooling efficiency due to an increase of the cooling load because moist air directly passes the evaporator 2, and if such an air flows to the inside of the vehicle in a cooled state after passing through the evaporator 2, comfort inside the vehicle is also deteriorated.

In order to solve the above problems, recently, an air conditioner in which a desiccant rotor 45 for dehumidification is mounted has been developed.

FIG. 2 is a block diagram of an air conditioner having the desiccant rotor. In brief, the conventional air conditioner having the desiccant rotor includes: a desiccant passageway 44 and a regeneration passageway 43 formed between an air blowing device 30 and an evaporator 41 of an air-conditioning case 40; a desiccant rotor 45 crossing over the desiccant passageway 44 and the regeneration passageway 43; and a regeneration heater 46 mounted inside the regeneration passageway 44 in front of the desiccant rotor 45.

In this instance, an outlet 44a of the regeneration passageway 44 extends in the outward direction of the vehicle, such that all of the air passing through the regeneration passageway 44 is discharged outside of the vehicle.

After that, if dehumidification is needed, the regeneration heater 46 is operated at the same time with rotation of the desiccant rotor 45.

Therefore, some of the air passing the air blowing device 30 flows to the evaporator 41 in a dehumidified state while passing the desiccant rotor 45 located in the desiccant passageway 43. After that, the air is cooled while passing through the evaporator 41, selectively passes through a heater core 42, and then, is supplied to the inside of the vehicle.

The remaining air passing the air blowing device 30 is flown into the regeneration passageway 44, and then, passes the desiccant rotor 45 located in the regeneration passageway 44 in a state where it is heated by the regeneration heater 46.

In this instance, because the desiccant rotor 45 rotates toward the regeneration passageway 44 in a state where it absorbs moisture in the desiccant passageway 43, the air heated by the regeneration heater 46 forces the moisture absorbed by the desiccant rotor 45 to evaporate while passing the desiccant rotor 45, and then, is discharged out through the outlet 44a of the regeneration passageway 44.

Through the above-mentioned process, the surface of the desiccant rotor 45 regenerates to its original dried condition so as to have the dehumidification capacity.

However, the conventional air conditioner has several problems in that the number of components is increased and the entire size of the air conditioner is also increased because the regeneration heater 46 must be installed in order to regenerate the desiccant rotor 45.

Moreover, because the air used for regeneration of the desiccant rotor 45 is unconditionally discharged out, the air-conditioning performance is lowered due to a decrease of air volume, and the conventional air conditioner is ineffective and has many difficulties in improving heating performance since lots of energy is abandoned during the heating mode.

Furthermore, the conventional air conditioner has another problem in that it is difficult to provide a pleasant environment to the inside of the vehicle because it cannot carry out an air-conditioning mode, such as ventilation inside the vehicle.

SUMMARY OF THE INVENTION

Accordingly, the present invention has been made to solve the above-mentioned problems occurring in the prior arts, and it is an object of the present invention to provide an air conditioner for a vehicle, which includes: a bypass passageway formed at a lower portion of an air-conditioning case which communicates with a desiccant part of a desiccant rotor and bypasses cold air and warm air passageways; a regeneration passageway formed at the lower portion of the air-conditioning case for supplying the air passing through the bypass passageway to a regeneration part of the desiccant rotor; and a heater having one side area arranged on the bypass passageway and the other side area arranged on the warm air passageway, so that the air conditioner heats the dehumidified air passing through the desiccant part of the desiccant rotor and the bypass passageway by the heater and supplies the heated air to the regeneration part of the desiccant rotor so as to regenerate the desiccant rotor, thereby reducing the number of components and the entire size because the heater is divided into two areas without using additional heat source, enhancing regeneration efficiency by removing more moisture from the desiccant rotor because the dehumidified air is heated to be used for regeneration of the desiccant rotor, enhancing heating performance and increasing an air volume by moving the air, which is heated while passing the bypass passageway through a door mounted in the communication chamber, toward the warm air passageway in a heating mode, and enhancing dehumidification and heating performance and ventilating the indoor air and drying the evaporator by performing not only the regeneration mode and the heating mode but also an exhaust mode for exhausting the air passing through the cold air and warm air passageways to the outside through the regeneration passageway.

To accomplish the above object, according to the present invention, there is provided an air conditioner for a vehicle including: an air blowing device; an air-conditioning case having an air inflow port formed on one side for introducing the air blown from the air blowing device into the air-conditioning case, a plurality of air outflow ports formed on the other side for discharging out air, a cold air passageway which is formed between the air inflow port and the air outflow ports and in which an evaporator is mounted, and a warm air passageway in which a heater is mounted; a desiccant rotor mounted at the upstream side of the evaporator in an air flow direction inside the air-conditioning case, one side of the desiccant rotor relative to the air-conditioning case being used as a desiccant part for dehumidifying the air flowing inside the air-conditioning case, the other side of the desiccant rotor being used as a regeneration part for drying and regenerating moisture absorbed at the desiccant part; and a bypass passageway and a regeneration passageway formed below the cold air passageway and the warm air passageway inside the air-conditioning case, the bypass passageway being adapted to let some of the air passing through the desiccant part of the desiccant rotor bypass the cold air passageway and the warm air passageway, the regeneration passageway being adapted to supply the air passing through the bypass passageway to the regeneration part of the desiccant rotor, wherein the heater has one side area arranged on the bypass passageway and the other side area arranged on the warm air passageway in order to heat the air flowing the bypass passageway and the warm air passageway, and heats the dehumidified air passing the bypass passageway through the desiccant part of the desiccant rotor, and then, supplies the heated air to the regeneration part of the desiccant rotor so as to regenerate the desiccant rotor.

According to the present invention, because the air conditioner for a vehicle includes: the bypass passageway formed at the lower portion of the air-conditioning case which communicates with the desiccant part of the desiccant rotor and bypasses the cold air and warm air passageways; the regeneration passageway formed at the lower portion of the air-conditioning case for supplying the air passing through the bypass passageway to the regeneration part of the desiccant rotor; and the heater having one side area arranged on the bypass passageway and the other side area arranged on the warm air passageway, the air conditioner heats the dehumidified air passing through the desiccant part of the desiccant rotor and the bypass passageway by the heater and supplies the heated air to the regeneration part of the desiccant rotor so as to regenerate the desiccant rotor, thereby reducing the number of components and the entire size because the heater is divided into two areas without using additional heat source, Moreover, the air conditioner for the vehicle according to the preferred embodiment of the present invention can remove more moisture from the desiccant rotor so as to enhance regeneration efficiency because the dehumidified air from the desiccant rotor is heated by the heater to be used for regeneration of the desiccant rotor.

Furthermore, the air conditioner for the vehicle according to the preferred embodiment of the present invention moves the air heated while passing through the bypass passageway to the warm air passageway so as to enhance heating performance and increase an air volume, thereby enhancing air-conditioning performance.

Additionally, the air conditioner for the vehicle according to the preferred embodiment of the present invention utilizes the structure of the drain part for discharging the condensate water to the outside of the vehicle when the outlet of the discharge passageway is formed for discharging the air passing through the regeneration part of the desiccant rotor to the outside, thereby simplifying the entire structure and achieving a compact-sized air conditioner.

In addition, because the dehumidified air passing through the desiccant part of the desiccant rotor bypasses the evaporator through the bypass passageway, a flow resistance is small.

Furthermore, because the heater is an electric heater and is divided into a warm air passageway side and a bypass passageway side in such a way as to turn on only an area which needs heating and to turn off an area which does not need heating according to the air-conditioning modes, the air conditioner for the vehicle according to the preferred embodiment of the present invention can enhance energy efficiency and save the battery for the vehicle.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
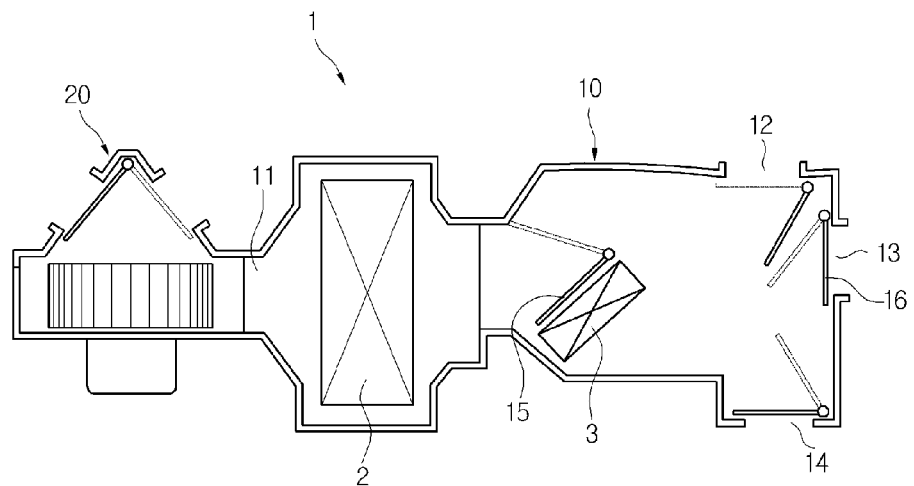
FIG. 1 is a block diagram of a conventional air conditioner for a vehicle.
Figure 2:
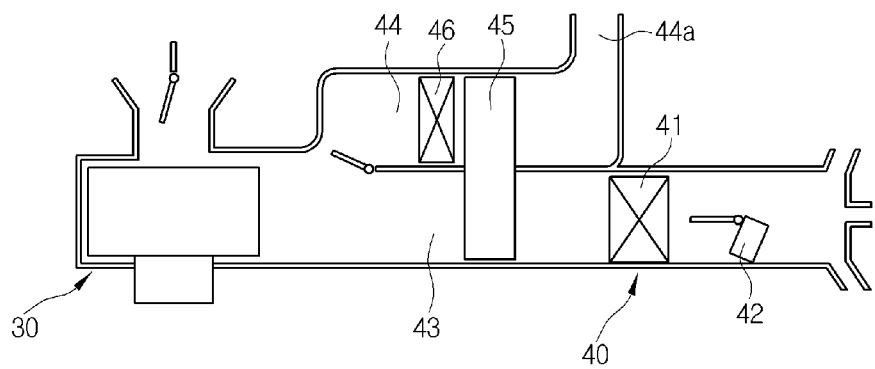
FIG. 2 is a block diagram of another conventional air conditioner having a desiccant rotor.
Figure 3:
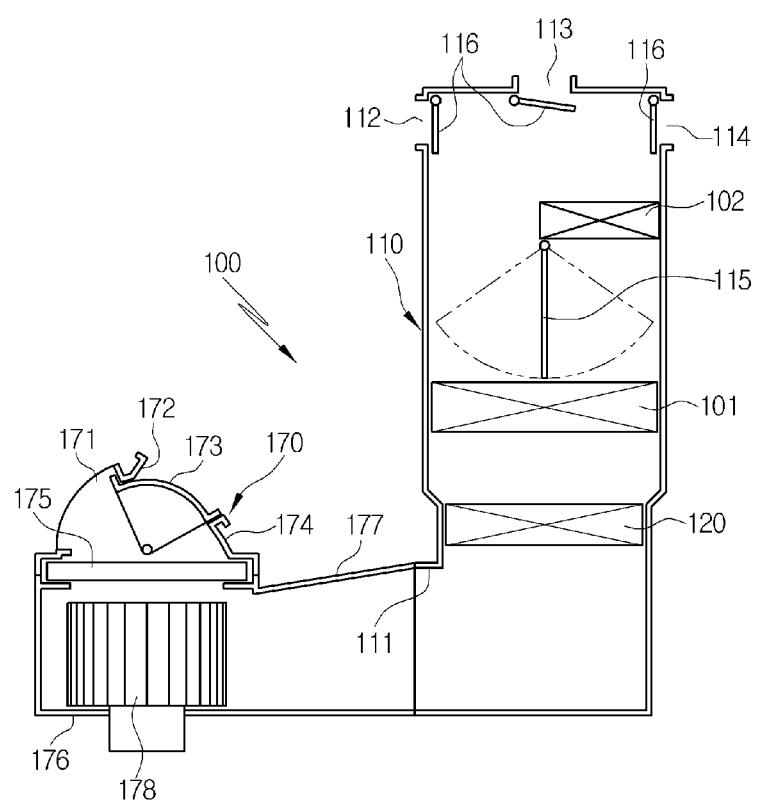
FIG. 3 is a schematic block diagram of an air conditioner for a vehicle according to a preferred embodiment of the present invention.
Figure 4:
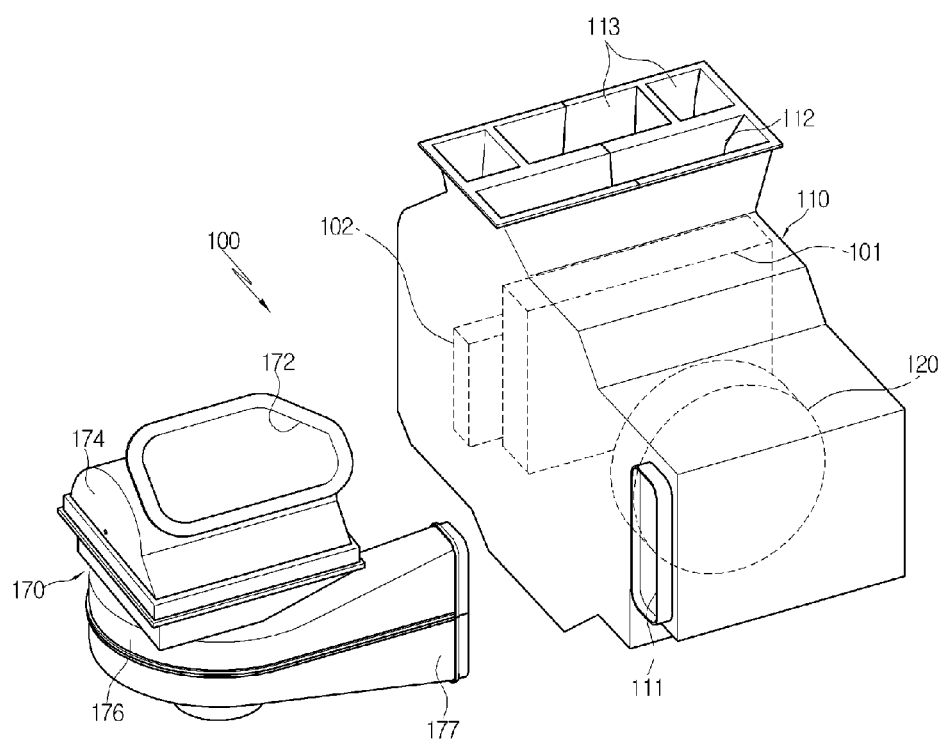
FIG. 4 is a perspective view showing a state where an air blowing device and an air-conditioning case of the air conditioner according to the preferred embodiment of the present invention are separated from each other.

Reference will be now made in detail to the preferred embodiments of the present invention with reference to the attached drawings.

As shown in the drawing, an air conditioner 100 for a vehicle according to a preferred embodiment of the present invention includes: an air blowing device 170 having a blower 178 disposed therein; an air-conditioning case 110 having an air inflow port 111 formed on one side thereof for introducing air blown from the air blowing device 170 into the air-conditioning case 110, a plurality of air outflow ports formed on the other side for discharging the introduced air, and an cold air passageway P1 and a warm air passageway P2 formed between the air inflow port and the air outflow port; an evaporator 101 and a heater 102 spaced apart from each other at a predetermined interval inside the air-conditioning case 110, the evaporator 101 being mounted on the cold air passageway P1, the heater 102 being mounted on the warm air passageway P2; and a temperature-adjusting door 115 mounted between the evaporator 101 and the heater 102 for adjusting the degree of opening of a cold air passageway P1, which bypasses the heater 102, and of a warm air passageway P2, which passes through the heater 102.

The air blowing device 170 includes: an intake duct 174 having an indoor air inlet 171 and an outdoor air inlet 172 formed at an upper portion and an indoor and outdoor air converting door 173 for opening and closing the indoor air inlet 171 and the outdoor air inlet 172; and a scroll case 176 joined to a lower portion of the intake duct 174 for accommodating the blower 178 therein.

The air blowing device 170 further includes a discharge part 177 extended from one side of the scroll case 176 for sending the air blown by the blower 178 to the air inflow port 111 of the air-conditioning case 110.

Moreover, a filter 175 for preventing that foreign matters enter a desiccant rotor 120, which will be described later, is mounted above (in the upstream side) the blower 178 inside the air blowing device 170.

The filter 175 is inserted and mounted between the intake duct 174 and the scroll case 176.

As described above, the filter 175 prevents that foreign matters enter the desiccant rotor 120 and enhances efficiency and durability of a desiccant material (not shown) inside the desiccant rotor 120.

Furthermore, at the plural air outflow ports formed at an exit side of the air-conditioning case 110, a defrost vent 112 for discharging air toward the front window of the vehicle, a face vent 113 for discharging air toward a front seat passenger's face, and a floor vent 114 for discharging air toward the passenger's feet.

Additionally, a plurality of mode doors 116 for respectively opening and closing the defrost vent 112, the face vent 113 and the floor vent 114 are mounted inside the air-conditioning case 110.

In the meantime, a drain part 118 for discharging condensate water which is generated and drops down from the surface of the evaporator 101 is formed at the air-conditioning case 110 below the evaporator 101.

The drain part 118 penetrates a bypass passageway 130, a discharge passageway 150 and a regeneration passageway 140, which will be described later, and extends downwardly from the air-conditioning case 110. In this instance, the drain part 118 does not communicate with the bypass passageway 130, the discharge passageway 150 and the regeneration passageway 140 and just goes through the bypass passageway 130, the discharge passageway 150 and the regeneration passageway 140.

Meanwhile, the cold air passageway P1 is formed in a section ranging from the evaporator 101 and the air outflow ports inside the air-conditioning case 110, and the warm air passageway P2 is branched from the cold air passageway P1 at the rear of the evaporator 101, goes through the heater 102, and then, meets the cold air passageway P1.

Here, at the point where the warm air passageway P2 is branched from the cold air passageway P1, the temperature-adjusting door 115 is mounted in order to adjust the degree of opening of the cold air passageway P1 and the warm air passageway P2, and at the point where the warm air passageway P2 meets the cold air passageway P1, a mixing chamber (MC) where the cold air and the warm air are mixed together is formed.

In addition, a desiccant rotor 120 is mounted at the upstream side (front side) of the evaporator 101 in an air flow direction inside the air-conditioning case 110. One side of the desiccant rotor 120 relative to the air-conditioning case 110 is used as a desiccant part 121 for dehumidifying the air flowing inside the air-conditioning case 110 and the other side is used as a regeneration part 122 for drying and regenerating moisture absorbed at the desiccant part 121.

It is preferable that the desiccant rotor 120 be mounted in a section ranging from the air inflow port 111 of the air-conditioning case 110 and the evaporator 101.

Moreover, at the front and rear sides of the desiccant rotor 120 of the air-conditioning case 110, formed are partition walls 117 for partitioning the inside of the air-conditioning case 110 into a desiccant part area 110a and a regeneration part area 110b relative to the desiccant rotor 120.

The partition walls 117 formed at the front and rear sides of the desiccant rotor 120 respectively extend from the lower surface inside the air-conditioning case 110 to the central portion of the desiccant rotor 120, and hence, the desiccant rotor 120 is mounted in such a way as to go through the partition walls 117 and to be slung on the partition wall 117.

Therefore, while the air blown from the air blowing device 170 and flowing inside the air-conditioning case 110 passes through the desiccant part 121 of the desiccant rotor 120 arranged at the upper side of the partition wall 117, moisture contained in the air is absorbed to the desiccant part 121 so as to be removed.

Meanwhile, because the regeneration part 122 of the desiccant rotor 120 is arranged at the lower side of the partition wall 117 and is divided from the air passageway inside the air-conditioning case 110, the air flowing inside the air-conditioning case 110 does not directly pass but only the air passing through the bypass passageway 130 and the regeneration passageway 140 passes through the regeneration part 122.

Furthermore, the desiccant rotor 120 has desiccant agents therein so as to absorb moisture contained in the air passing through the desiccant rotor 120.

The desiccant rotor 120 is formed in a cylindrical shape and is rotatably mounted on the partition wall 117. In this instance, a support bracket (not shown) may be formed on the partition wall 117 in order to rotatably support the desiccant rotor 120.

Additionally, a motor (not shown) is mounted inside the air-conditioning case 110 for rotating the desiccant rotor 120.

The motor may be fixed to the partition wall 117 in order to directly rotate the desiccant rotor 120 or may be mounted inside the air-conditioning case 110 on the outer face of the desiccant rotor 120 and connected with the desiccant rotor 120 via a belt so as to rotate the desiccant rotor 120.

Moreover, below the cold air passageway P1 and the warm air passageway P2 inside the air-conditioning case 110, formed are the bypass passageway 130 and the regeneration passageway 140. The bypass passageway 130 makes some of the air passing through the desiccant part 121 of the desiccant rotor 120 bypass the cold air passageway P1 and the warm air passageway P2, and the regeneration passageway 140 supplies the air passing through the bypass passageway 130 to the regeneration part 122 of the desiccant rotor 120.

That is, in order to supply the dehumidified air passing through the desiccant part 121 of the desiccant rotor 120 to the regeneration part 122 of the desiccant rotor 120, the bypass passageway 130 and the regeneration passageway 140 are formed at the lower portion of the air-conditioning case 110.

In this instance, because the dehumidified air passing through the desiccant part 121 of the desiccant rotor 120 bypasses the evaporator 101 through the bypass passageway 130, a flow resistance is small.

Furthermore, near an outlet 130b of the bypass passageway 130 inside the air-conditioning case 110, formed is a communication chamber 180 for communicating the bypass passageway 130 and the regeneration passageway 140 with the warm air passageway P2 located at the rear side of the heater 102.

That is, the communication chamber 180 is formed at a position where the warm air passageway P2 located at the rear of the heater 102, the bypass passageway 130 and the regeneration passageway 140 meet together in order to communicate all of the warm air passageway P2 located at the rear of the heater 102, the bypass passageway 130 and the regeneration passageway 140.

Additionally, an inlet 130a of the bypass passageway 130 is communicated with an air passageway between the desiccant rotor 120 and the evaporator 101, and the outlet 130b of the bypass passageway 130 is communicated with the communication chamber 80.

Furthermore, a warm air communication hole 132 for communicating the rear side warm air passageway P2 of the heater 102 and the communication chamber 180 with each other is formed on a partition wall 133 formed between the rear side warm air passageway P2 of the heater 102 and the communication chamber 180. In this instance, the partition wall 133 in which the warm air communication hole 132 is formed extends from the partition wall 131 which partitions the cold air passageway P1 and the warm air passageway P2 from the bypass passageway 130.

Additionally, a regeneration communication hole 142 for communicating the outlet 130b of the bypass passageway 130 with an inlet 140a of the regeneration passageway 140 is formed on a partition wall 141 which partitions the regeneration passageway 140 from the bypass passageway 130.

In the meantime, as shown in FIGS. 5 to 8, in the case that a door 160 mounted at the communication chamber 180 is a flat type door, the warm air communication hole 132 and the regeneration communication hole 142 which are respectively opened and closed by the door 160 are needed, but as shown in FIGS. 9 to 12, in the case that the door 160 is a sliding type door, the regeneration communication hole 142 is omitted and only the warm air communication hole 132 is formed, so that the door 160 directly opens and closes the warm air communication hole 132, the bypass passageway 130 and the regeneration passageway 140.

Moreover, the inlet 140a of the regeneration passageway 140 communicates with the communication chamber 180, and the outlet 140b communicates with the front part of the regeneration part 122 of the desiccant rotor 120.

Therefore, the dehumidified air passing through the desiccant part 121 of the desiccant rotor 120 can be supplied to the regeneration part 122 of the desiccant rotor 120 through the bypass passageway 130 and the regeneration passageway 140.

Of course, the air passing through the bypass passageway 130 may be supplied to the rear side warm air passageway P2 of the heater 102 through the communication chamber 180 and the warm air communication hole 132, and the air passing through the cold air passageway P1 and the warm air passageway P2 may be supplied to the regeneration passageway 140 through the warm air communication hole 132 and the communication chamber 180.

Moreover, a discharge passageway 150 is formed between the bypass passageway 130 and the regeneration passageway 140 so as to discharge out the air passing through the regeneration part 122 of the desiccant rotor 120 through the regeneration passageway 140.

An inlet 150a of the discharge passageway 150 communicates with the rear side of the regeneration part 122 of the desiccant rotor 120, and an outlet 150b is adjacent to the drain part 118.

In this instance, an outlet 150b of the discharge passageway 150 goes through the regeneration passageway 140 and extends in the same direction as the drain part 118.

Furthermore, the outlet 150b of the discharge passageway 150 may be formed integrally with one side of the drain part 118, or may be formed around the drain part 118 in a dual tube structure.

As described above, because the structure of the drain part 118 for discharging the condensate water to the outside of the vehicle is utilized when the outlet 150b of the discharge passageway 150 is formed for discharging the air passing through the regeneration part 122 of the desiccant rotor 120 to the outside, the air conditioner according to the preferred embodiment of the present invention is simplified in the entire structure and is compact-sized.

Additionally, the heater 102 may be a heater core 103 or an electric heater 104.

The heater core 103 is a heat exchanger in which cooling water of an engine of the vehicle flows and includes a plurality of tubes 103b connected between a pair of tanks 103a and radiation fins 103c mounted between the tubes 103b. The hot cooling water heated during a process of cooling the engine of the vehicle circulates the heater core 103, and in this instance, heats the air passing through the heater core 103.

Here, the heater core 103 has inlet and outlet pipes 103d disposed at the tanks for introducing cooling water into the heater core 103 and for discharging the cooling water to the outside.

In the meantime, not shown in the drawings, but the heater core 103 may further include a flow control heater core capable of a flow control of the cooling water passing through the plural tubes 103b.

The electric heater 104 is heated by receiving electric power from a battery of the vehicle, and includes: a housing 104a forming the outward appearance; a core part 104b mounted inside the housing 104a for generating heat when receiving electric power; and a control part 104e connected to one end portion of the core part 104b for controlling electric voltage supplied to the core part 104b.

The core part 104b includes: a plurality of heating rods 104c in each of which a positive(+) terminal (not shown) and a PTC (Positive Temperature Coefficient) element are embedded; a plurality of heating rods 104c in each of which a negative(−) terminal and an PTC element are embedded, the heating rods 104c in each of which the (−) terminal and the PTC element are embedded and the heating rods 104c in each of which the (−) terminal and the PTC element are embedded being layered by turns; and radiation fins 104d interposed between the heating rods 104c.

Therefore, when electric voltage is supplied to the (+) terminal and the (−) terminal of the heating rods 104c through the control part 104e, while the PTC element generates heat, the heating rods 104c are heated and transfer electric heat to the radiation fins 104d, and in this instance, the air passing through the radiation fins 104d of the core part 104b is heated.

Moreover, the control part 104e controls electric voltage supplied to the heating rods 104c using a PWM (Pulse Width Modulation) control or a relay control.

The heater 102 has one side area 102a arranged on the bypass passageway 130 and the other side area 102b arranged on the warm air passageway P2 so as to heat the air flowing in the bypass passageway 130 and the warm air passageway P2.

In this instance, it is preferable that the one side area 102a of the heater 102 arranged on the bypass passageway 130 be smaller than the other side area 102b arranged on the warm air passageway P2.

Therefore, the dehumidified air passing through the desiccant part 121 of the desiccant rotor 120 bypasses the evaporator 101 while passing through the bypass passageway 130, and after that, is heated while passing through the one side area 102a of the heater 102. The heated air is supplied to the regeneration part 122 of the desiccant rotor 120 through the regeneration passageway 140 so as to dry and regenerate the desiccant rotor 120.

In more detail, the air blown from the air blowing device 170 is introduced into the air-conditioning case 110 and passes through the desiccant part 121 of the desiccant rotor 120. In the above-mentioned process, moisture contained in the air is absorbed to the desiccant rotor 120 so as to be dehumidified. Continuously, some of the air dehumidified while passing through the desiccant rotor 120 passes through the evaporator 101 and is discharged to the inside of the vehicle after selectively passing through the heater 102, and the remaining air is introduced into the bypass passageway 130.

The dehumidified air introduced into the bypass passageway 130 bypasses the evaporator 101, and then is heated while passing through the one side area 102a of the heater 102 arranged on the bypass passageway 130. The heated air is supplied to the regeneration part 122 of the desiccant rotor 120 through the regeneration passageway 140. Of course, the heated air passing through the bypass passageway 130 by a control of the door 160 may be supplied toward the rear side warm air passageway P2 of the heater 102.

Continuously, the heated air supplied to the regeneration part 122 of the desiccant rotor 120 passes through a portion (regeneration part) of the desiccant rotor 120 rotated to the regeneration part area 110b in a state where moisture is absorbed in the desiccant part area 110a inside the air-conditioning case 110. In the above-mentioned process, moisture absorbed to the desiccant rotor 120 is forcedly evaporated, and after that, the air humidified while passing through the regeneration part 122 of the desiccant rotor 120 is discharged out through the discharge passageway 150.

Through the above-mentioned process, the desiccant rotor 120 is regenerated to its original dried condition so as to have the dehumidification capacity.

That is, because the desiccant rotor 120 continuously rotates in the desiccant part area 110a and the regeneration part area 110b inside the air-conditioning case 110 partitioned by the partition wall 117, the portion which absorbed moisture while passing through the desiccant part area 110a repeats the regenerated process by the heated air while passing through the regeneration part area 110b.

Moreover, the heater 102 separately controls ON-OFF modes of the one side area 102a arranged on the bypass passageway 130 and the other side area 102b arranged on the warm air passageway P2.

In other words, the single heater 102 is divided into two areas and controls in such a way as to turn on an area which needs heating and to turn off an area which does not need heating according to the air-conditioning modes, such that the air conditioner can enhance energy efficiency in the case that the electric heater 104 is used as the heater 102 and can save the battery for the vehicle.

That is, the control part 104e of the electric heater 104 individually and separately controls the ON-OFF modes of the heating rods 104c of the one side area 102a arranged on the bypass passageway 130 and the heating rods 104c of the other side area 102b arranged on the warm air passageway P2.

As an example, in the greatest cooling mode, because there is no need to operate the other side area 102b of the electric heater arranged on the warm air passageway P2, the heating rods 104c of the other side area 102b arranged on the warm air passageway P2 are turned off by cutting off voltage, only the heating rods 104c of the one side area 102a arranged on the bypass passageway 130 are turned on by supplying voltage, so as to enhance energy efficiency.

Furthermore, the control part 104e of the electric heater 104 individually controls the ON-OFF modes of the two areas of the electric heater 104 using the relay control or the PWM (Pulse Width Modulation) control.

Meanwhile, in the case that the flow control heater core is used as the heater 102, the cooling water flowing in the tubes 103b of the one side area 102a arranged on the bypass passageway 130 and the cooling water flowing in the tubes 103b of the other side area 102b arranged on the warm air passageway P2 are individually controlled in ON-OFF modes, such that only the area which needs heating is turned on but the area which does not need heating is turned off according to the air-conditioning modes so as to enhance energy efficiency.

Additionally, doors 160 for selectively opening and closing the rear side warm air passageway P2 of the heater 102, the bypass passageway 130 and the regeneration passageway 140 is mounted inside the communication chamber 180.

The doors 160 may be flat type doors illustrated in FIGS. 5 to 8 or sliding type doors illustrated in FIGS. 9 to 12.

First, the flat type doors 160 illustrated in FIGS. 5 to 8 will be described. The doors 160 are mounted inside the communication chamber 180 adjacent to the outlet 130b of the bypass passageway 130 for selectively opening and closing the warm air communication hole 132 and the regeneration communication hole 142. Of course, the doors 160 can open all of the warm air communication hole 132 and the regeneration communication hole 142.

Therefore, when the door 160 opens the regeneration communication hole 142, the bypass passageway 130 and the regeneration passageway 140 are communicated with each other, so that the air passing through the bypass passageway 130 flows toward the regeneration passageway 140. When the door 160 opens the warm air communication hole 132, the bypass passageway 130 and the warm air passageway P2 are communicated with each other, so that the air passing through the bypass passageway 130 flows to the rear side warm air passageway P2 of the heater 102.

The door 160 includes: a rotary shaft 161 rotatably mounted to the air-conditioning case 110; and a plate 162 extending from the side of the rotary shaft 161 in a radial direction for opening and closing the warm air communication hole 132 and the regeneration communication hole 142.

Figure 5:
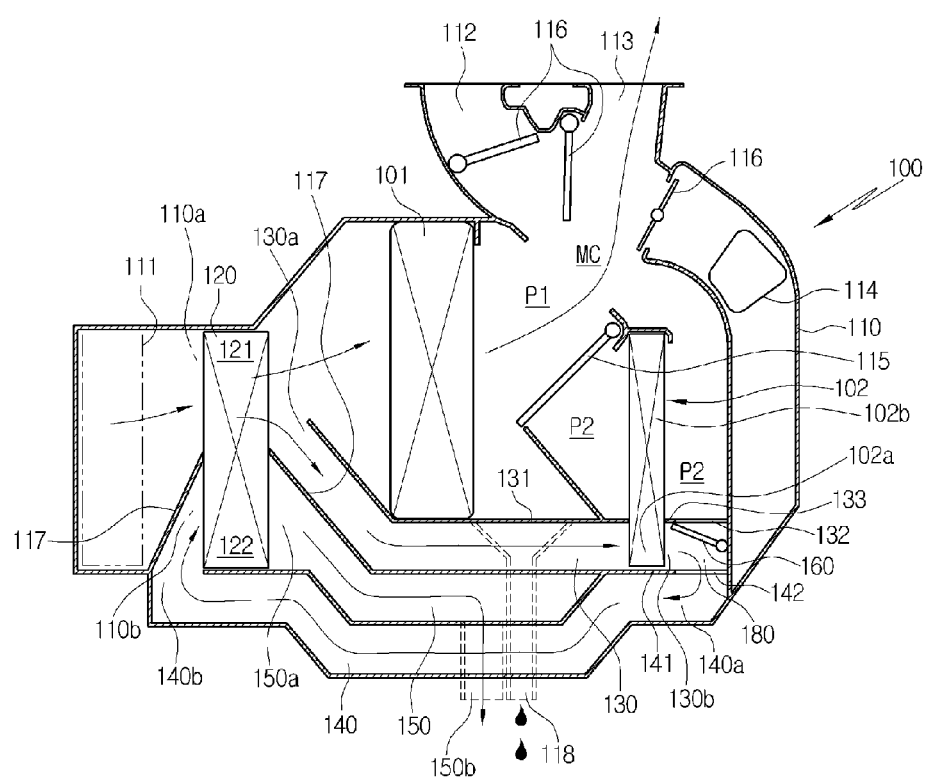
FIG. 5 is a sectional view of a regeneration mode of the air conditioner according to the preferred embodiment of the present invention.

Now, the air-conditioning modes according to the operation of the door 160 will be described. In the regeneration mode (cooling mode), as shown in FIG. 5, the door 160 closes the warm air communication hole 132 and opens the regeneration communication hole 142, that is, works to communicate the bypass passageway 130 and the regeneration passageway 140 with each other. Therefore, some of the dehumidified air passing through the desiccant rotor 120 is heated while passing through the one side area 102a of the heater 102 after being introduced into the bypass passageway 130, and then, is introduced into the regeneration passageway 140 through the regeneration communication hole 142 opened by the door 160 and is supplied to the regeneration part 122 of the desiccant rotor 120. The heated air supplied to the regeneration part 122 of the desiccant rotor 120 dries and regenerates the desiccant rotor 120 while passing through the desiccant rotor 120, and then, is discharged out through the discharge passageway 150.

Figure 6:
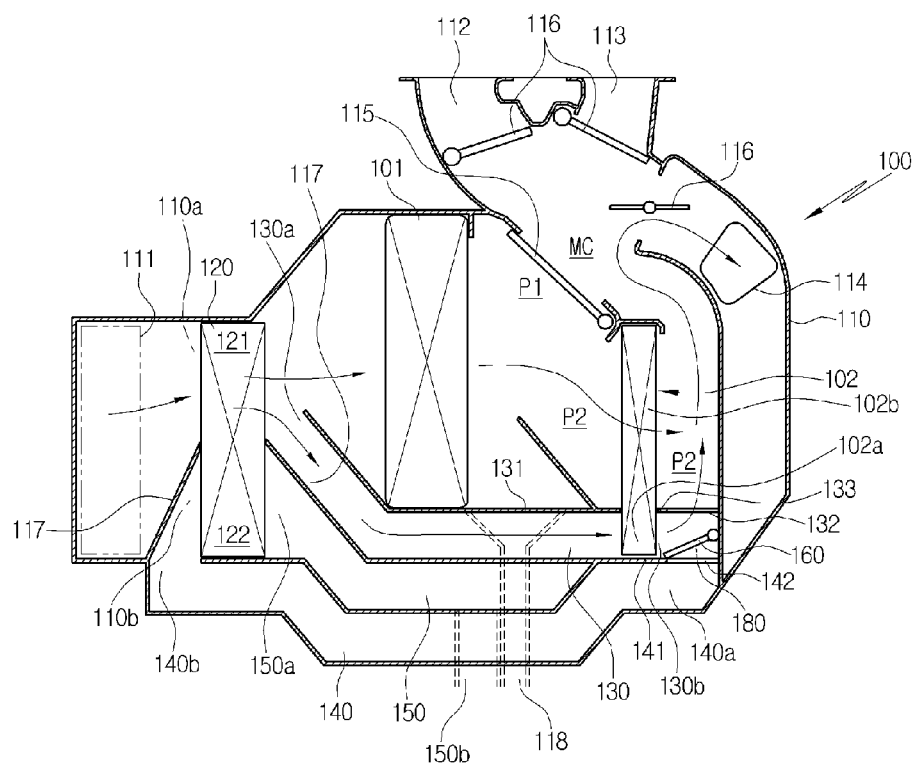
FIG. 6 is a sectional view of a heating mode of the air conditioner according to the preferred embodiment of the present invention.
Figure 7:
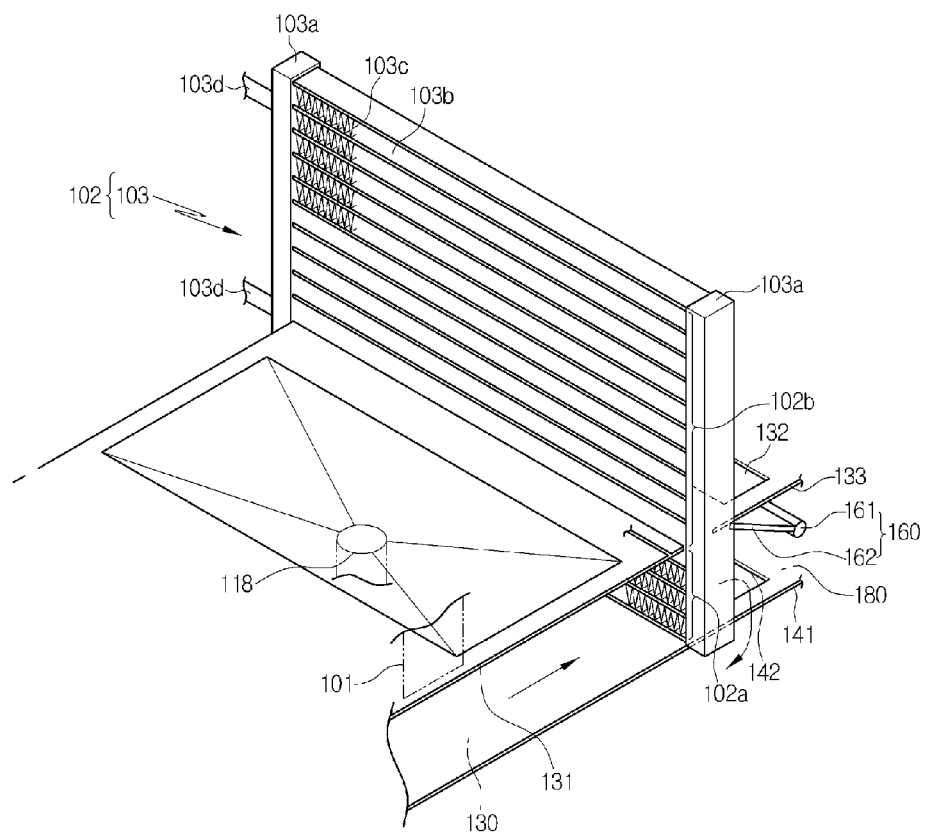
FIG. 7 is a perspective view showing a case that a heater is a heater core in the air conditioner according to the preferred embodiment of the present invention.
Figure 8:
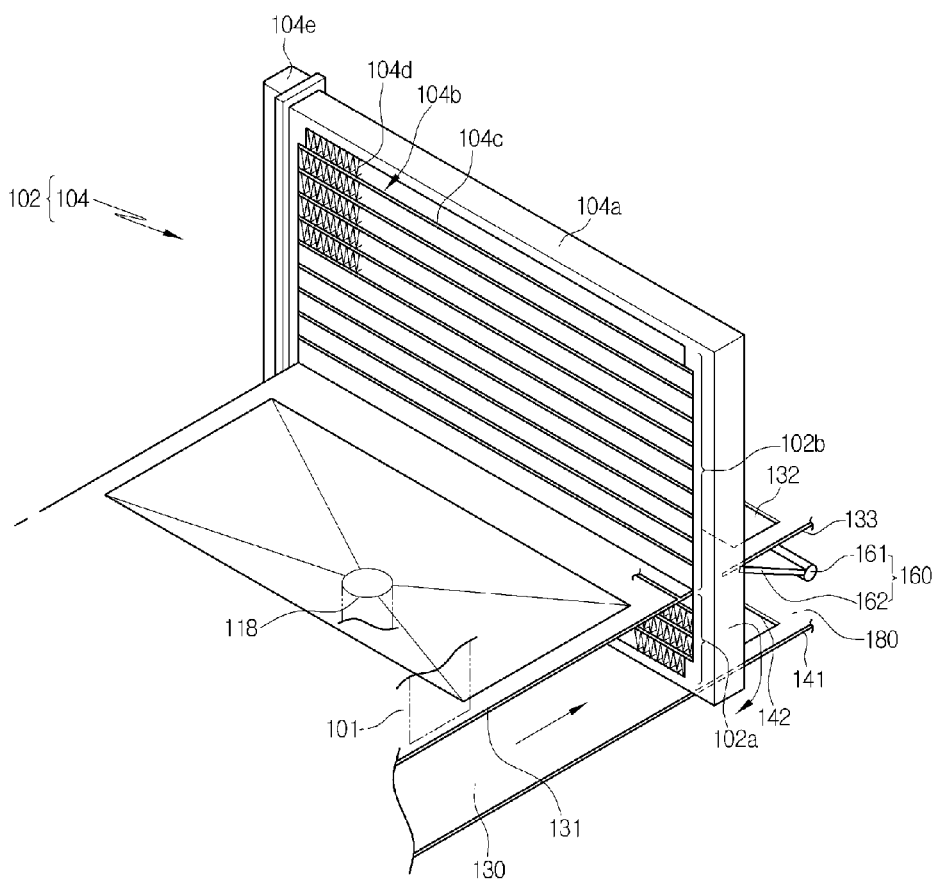
FIG. 8 is a perspective view showing a case that the heater is an electric heater in the air conditioner according to the preferred embodiment of the present invention.

In the heating mode, as shown in FIG. 6, the door 160 opens the warm air communication hole 132 and closes the regeneration communication hole 142, that is, works to communicate the bypass passageway 130 and the rear side warm air passageway P2 of the heater 102 with each other. Therefore, some of the air passing through the desiccant rotor 120 is heated while passing through the one side area 102a of the heater 102 after being introduced into the bypass passageway 130, and then, is introduced into the rear side warm air passageway P2 of the heater 102 through the warm air communication hole 132 opened by the door 160. The air is mixed with the air flowing in the warm air passageway P2 of the air-conditioning case 110 and then is discharged to the inside of the vehicle.

Moreover, because the air flowing to the bypass passageway 130 bypasses the evaporator 101, a small flow resistance is applied.

Furthermore, in the heating mode, the entire air passing through the bypass passageway 130 is introduced into the warm air passageway P2 so as to increase an air volume. In order to dry and regenerate the desiccant rotor 120, the air heated by the heater 102 while passing through the bypass passageway 130 is utilized as a heat source inside the vehicle so as to enhance heating performance.

In the meantime, not shown in the drawings, but in the exhaust mode, the door 160 opens all of the warm air communication hole 132 and the regeneration communication hole 142, that is, communicates the regeneration passageway 140 with the rear side warm air passageway P2 of the heater 102, and at the same time, the mode doors 116 close all of the plural air outflow ports. Therefore, some of the air passing through the desiccant rotor 120 passes the one side area 102a of the heater 102 and flows into the communication chamber 180 after being introduced into the bypass passageway 130, and the remaining air flows to the communication chamber 180 after passing through the cold air passageway P1 and the warm air passageway P2, and then, is introduced into the regeneration passageway 140 and is discharged out through the discharge passageway 150 after passing through the regeneration part 122 of the desiccant rotor 120.

Additionally, for the exhaust mode, it is preferable that the door 160 is spaced apart from the heater 102 so that the air of the warm air passageway P2 can smoothly flow to the regeneration passageway 140.

Next, the sliding type door 160 illustrated in FIGS. 9 to 12 will be described. The door 160 is mounted to selectively open and close the rear side warm air passageway P2, the bypass passageway 130 and the regeneration passageway 140 relative to the communication chamber 180, such that air flows along the two specific passageways communicated with each other when the door 160 opens them according to the air-conditioning modes.

The door 160 includes: a thin film member 165 slidably mounted inside the communication chamber 180 for selectively opening and closing the warm air communication hole 132, the outlet 130b of the bypass passageway 130 and the inlet 140a of the regeneration passageway 140 according to a sliding position; and a gear part 164 rotatably mounted inside the communication chamber 180 and engaged with one side of the thin film member 165 so as to operate the thin film member 165.

The thin film member 165 has a gear groove 165a formed at one side of the thin film member 165 corresponding with the gear part 164 of a gear shaft 163 and engaged with the gear part 164, and the air-conditioning case 110 has an actuator (not shown) mounted at the outer surface thereof for rotatably driving the gear shaft 163.

Therefore, when the gear shaft 163 rotates, the thin film member 165 slides inside the communication chamber 180 so as to selectively open and close the warm air communication hole 132, the outlet 130b of the bypass passageway 130 and the inlet 140a of the regeneration passageway 140.

In this instance, when the thin film member 165 of the door 160 closes the warm air communication hole 132, the bypass passageway 130 and the regeneration passageway 140 are communicated with each other. When the thin film member 165 closes the inlet 140a of the regeneration passageway 140, the bypass passageway 130 and the rear side warm air passageway P2 of the heater 102 are communicated with each other. When the thin film member 165 closes the outlet 130b of the bypass passageway 130, the rear side warm air passageway P2 of the heater 102 and the regeneration passageway 140 are communicated with each other.

Moreover, the air-conditioning modes according to the operation of the door 160 will be now described. The air conditioner for the vehicle according to the preferred embodiment of the present invention carries out a regeneration mode (FIG. 9) that the door 160 closes the warm air communication hole 132 so as to flow the air passing the bypass passageway 130 toward the regeneration passageway 140, a heating mode (FIG. 10) that the door 160 closes the inlet 140a of the regeneration passageway 140 so as to flow the air passing the bypass passageway 130 toward the rear side warm air passageway P2 of the heater 102, and an exhaust mode (FIG. 11) that the door 160 closes the outlet 130b of the bypass passageway 130 and closes all of the air outflow ports 112, 113 and 114 so as to flow the air passing the cold air passageway P1 and the warm air passageway P2 toward the regeneration passageway 140.

Meanwhile, the cooling mode is the same as the regeneration mode, and if dehumidification is needed, the regeneration mode is carried out without regard to the cooling mode and the heating mode.

Figure 9:
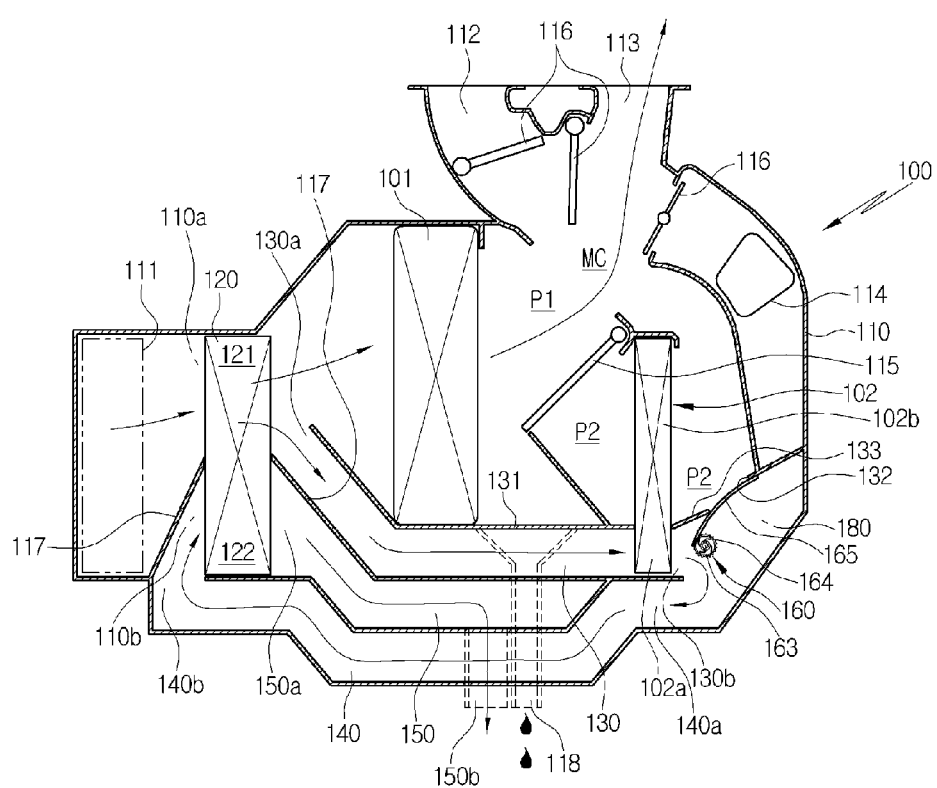
FIG. 9 is a sectional view of a regeneration mode of the air conditioner according to a second preferred embodiment of the present invention.

Therefore, as shown in FIG. 9, in the regeneration mode, the door 160 closes the warm air communication hole 132 so as to communicate the regeneration passageway 140 with the bypass passageway 130, such that some of the dehumidified air passing through the desiccant rotor 120 is introduced into the bypass passageway 130 and is heated while passing through the one side area 102a of the heater 102. After that, the heated air is introduced into the regeneration passageway 140 through the communication chamber 180 and is supplied to the regeneration part 122 of the desiccant rotor 120. The heated air supplied to the regeneration part 122 of the desiccant rotor 120 dries and regenerates the desiccant rotor 120 while passing through the desiccant rotor 120, and then, is discharged out through the discharge passageway 150.

Figure 10:
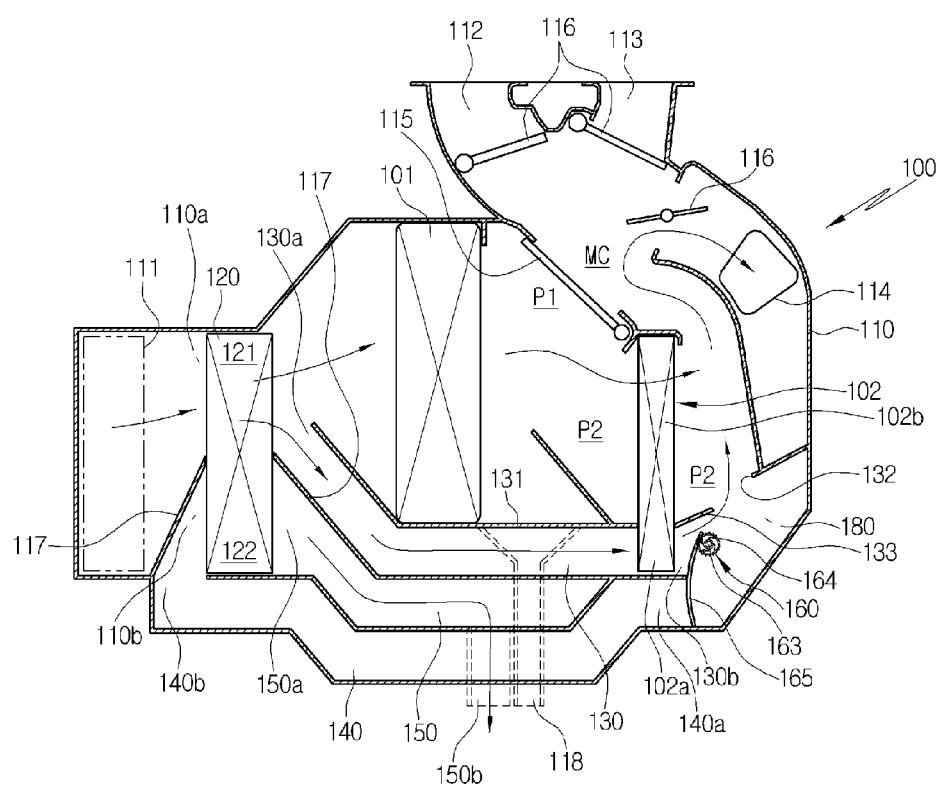
FIG. 10 is a sectional view of a heating mode of the air conditioner according to the second preferred embodiment of the present invention.

In the heating mode, as shown in FIG. 10, the door 160 closes the inlet 140a of the regeneration passageway 140 so as to communicate the rear side warm air passageway P2 of the heater 102 with the bypass passageway 130, such that some of the air passing through the desiccant rotor 120 is introduced into the bypass passageway 130, and is heated while passing the one side area 102a of the heater 102. After that, the heated air is introduced into the rear side warm air passageway P2 of the heater 102 through the communication chamber 180 and the warm air communication hole 132, and then, is discharged to the inside of the vehicle after being mixed with the air flowing inside the warm air passageway P2 of the air-conditioning case 110.

Figure 11:
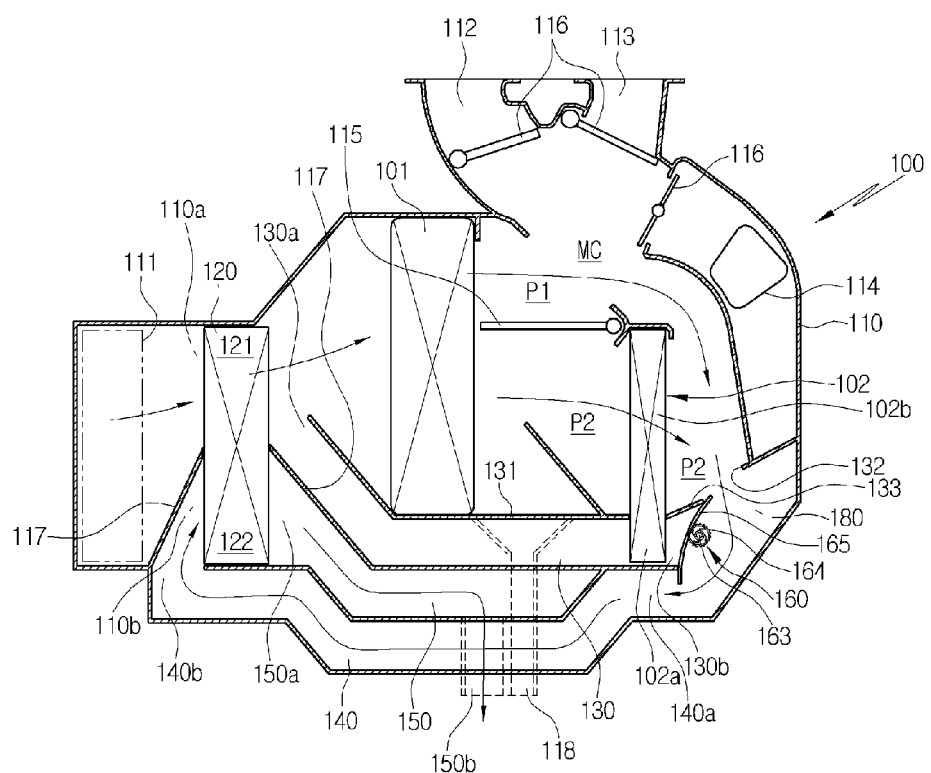
FIG. 11 is a sectional view of an exhaust mode of the air conditioner according to the second preferred embodiment of the present invention.
Figure 12:
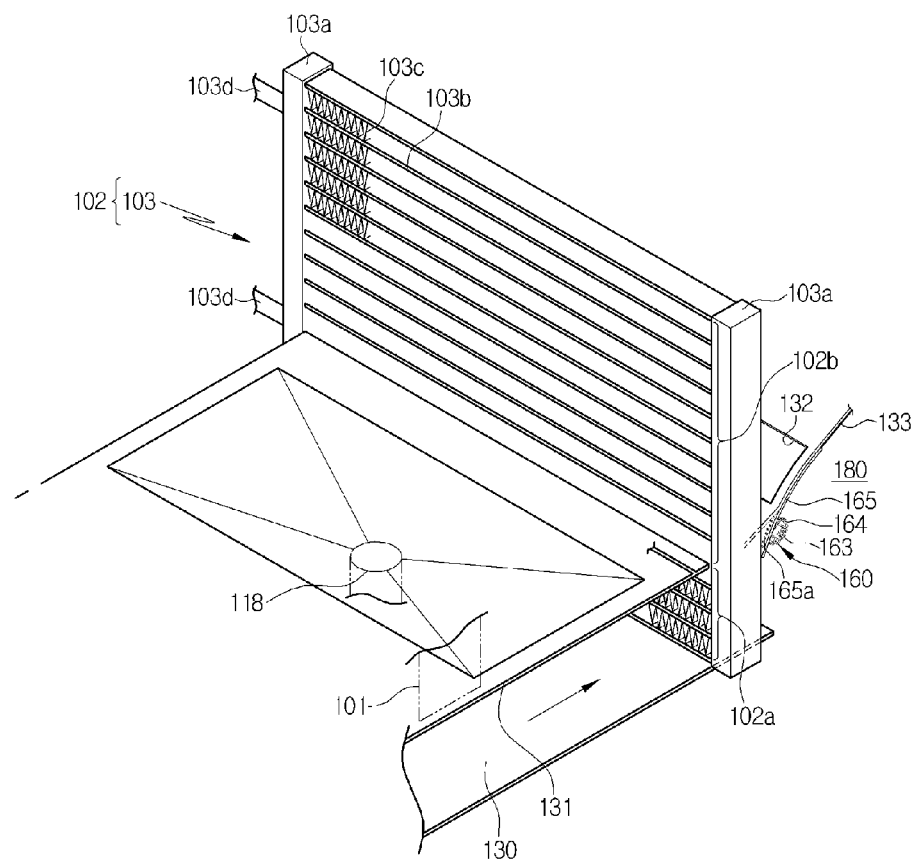
FIG. 12 is a partially perspective view showing a part where the heater and a door of FIG. 9 are mounted.

In the exhaust mode, as shown in FIG. 11, the door 160 closes the outlet 130b of the bypass passageway 130 so as to communicate the regeneration passageway 140 with the rear side warm air passageway P2 of the heater 102, such that the entire air passing through the desiccant rotor 120 passes the evaporator 101 and the heater 102 through the cold air passageway P1 and the warm air passageway P2. After that, the air is introduced into the regeneration passageway 140 through the warm air communication hole 132 and the communication chamber 180, and then, is discharged out through the discharge passageway 150 after passing through the regeneration part 122 of the desiccant rotor 120.

In the meantime, in the exhaust mode, all of the air outflow ports 112, 113 and 114 are closed by the mode doors 116, and the mode of the air blowing device 170 is converted into an indoor air inflow mode.

Therefore, in the exhaust mode, the indoor air of the vehicle is supplied to the air-conditioning case 110 by the air blowing device 170, and the indoor air supplied to the air-conditioning case 110 passes through the desiccant rotor and then is discharged out through the cold air and warm air passageways P1 and P2, the communication chamber 180, the regeneration passageway 140, and the discharge passageway 150 in order so as to forcedly ventilate the indoor air of the vehicle and dry the evaporator 101. Therefore, the air conditioner having the dehumidification function according to the preferred embodiment of the present invention can enhance productivity of the air conditioner and keep a pleasant indoor environment of the vehicle.

In the meantime, in the heating mode, the air conditioner according to the preferred embodiment of the present invention increases air volume because the entire air passing through the bypass passageway 130 is introduced into the warm air passageway P2, and enhance the heating performance because using the air, which is heated by the heater 102 while passing through the bypass passageway 130, as a heat source for heating the inside of the vehicle.

Furthermore, the air conditioner 100 includes a control part (not shown) for variably controlling RPM of the desiccant rotor 120 by controlling the motor according to the air volume blown from the air blowing device 170.

That is, the desiccant rotor 120 has the optimum RPM showing the maximum dehumidification efficiency according to the air volume passing the desiccant materials and component performances of the desiccant materials.

Therefore, supposing that the component performances of the desiccant materials are the same, the control part controls the desiccant rotor 120 to the optimum PRM according to the air volume blown from the air blowing device 170, namely, the RPM for controlling the blower 178, so as to provide the maximum dehumidification efficiency.

Hereinafter, the action of the air conditioner for the vehicle according to the preferred embodiment of the present invention will be described. For convenience, referring to FIGS. 9 to 11 showing the structure of the sliding type door 160, only the air-conditioning modes related with the door 160 will be described.

A. Regeneration Mode (Greatest Cooling Mode)

As shown in FIG. 9, in the regeneration mode, the door 160 closes the warm air communication hole 132 so as to communicate the bypass passageway 130 with the regeneration passageway 140, and the temperature-adjusting door 115 controls the degree of opening of the cold air passageway P1 and the warm air passageway P2 according to the adjusted temperature. Hereinafter, referring to FIG. 9, the cooling mode that the temperature-adjusting door 115 opens the cold air passageway P1 will be described as an example.

Moreover, the desiccant rotor 120 is rotated by the motor.

Furthermore, in the case that the heater 102 is the heater core 103, cooling water circulates inside the heater core 103. In the case that the heater 102 is the electric heater 104, the heater controls in such a way as to turn on only the heating rods 104c of the one side area 102a arranged on the bypass passageway 130 and to turn off the heating rods 104c of the other side area 102b arranged on the warm air passageway P2.

Therefore, the air blown by the air blowing device 170 is introduced into the air-conditioning case 110, and then, passes through the desiccant part 121 of the desiccant rotor 120 while flowing in the desiccant part area 110a inside the air-conditioning case 110. In the above process, moisture contained in the air is absorbed to the desiccant rotor 120 so as to be dehumidified.

Continuously, some of the dehumidified air passing through the desiccant rotor 120 is cooled while passing through the evaporator 101, and then, bypasses the heater 102 by the temperature-adjusting door 115. After that, the cooled air is discharged to the inside of the vehicle through the air outflow ports of the air-conditioning case 110 opened by the air discharge mode (the face mode, the floor mode, the defrost mode, the mix mode, and the bi-level mode) so as to cool the inside of the vehicle.

The remaining air of the dehumidified air passing through the desiccant rotor 120 is introduced into the bypass passageway 130 and bypasses the evaporator 101, and then, is heated while passing through the one side area 102a of the heater 102. Continuously, the air heated by the heater 102 while passing through the bypass passageway 130 is introduced into the regeneration passageway 140 through the communication chamber 180, and then, is supplied to the regeneration part 122 of the desiccant rotor 120. After that, the heated air dries and regenerates the desiccant rotor 120 while passing through the regeneration part 122 of the desiccant rotor 120, and then, is discharged out through the discharge passageway 150.

Additionally, the desiccant rotor 120 operated rotatably absorbs moisture from the air passing through the desiccant part area 110a inside the air-conditioning case 110 so as to dehumidify, and then forcedly evaporates moisture absorbed by the heated air passing through the regeneration part area 110b inside the air-conditioning case 110 through the bypass passageway 130 and the regeneration passageway 140. Through the above-mentioned process, the desiccant rotor 120 is regenerated to its original dried condition so as to have the dehumidification capacity.

B. Heating Mode (Greatest Heating Mode)

As shown in FIG. 10, in the heating mode, the door 160 closes the inlet 140a of the regeneration passageway 140 so as to communicate the bypass passageway 130 with the rear side warm air passageway P2 of the heater 102, and the temperature-adjusting door 115 closes the cold air passageway P1 and opens the warm air passageway P2 inside the air-conditioning case 110.

Moreover, the desiccant rotor 120 is rotated by the motor.

Furthermore, in the case that the heater 102 is the heater core 103, cooling water circulates inside the heater core 103. In the case that the heater 102 is the electric heater 104, the heater controls in such a way as to turn on all of the heating rods 104c of the one side area 102a arranged on the bypass passageway 130 and of the other side area 102b arranged on the warm air passageway P2.

Therefore, the air blown by the air blowing device 170 is introduced into the air-conditioning case 110, and then, passes through the desiccant part 121 of the desiccant rotor 120 while flowing in the desiccant part area 110a inside the air-conditioning case 110. In the above process, moisture contained in the air is absorbed to the desiccant rotor 120 so as to be dehumidified.

Continuously, some of the dehumidified air passing through the desiccant rotor 120 is heated while passing through the other side area 102b of the heater 102 arranged on the warm air passageway P2 by the temperature-adjusting door 115 after passing through the evaporator 101. After that, the heated air is discharged to the inside of the vehicle through the air outflow ports of the air-conditioning case 110 opened by the air discharge mode (the face mode, the floor mode, the defrost mode, the mix mode, and the bi-level mode) so as to heat the inside of the vehicle.

The remaining air of the dehumidified air passing through the desiccant rotor 120 is introduced into the bypass passageway 130 and bypasses the evaporator 101, and then, is heated while passing through the one side area 102a of the heater 102. Continuously, the air heated by the heater 102 while passing through the bypass passageway 130 is introduced into the rear side warm air passageway P2 of the heater 102 through the communication chamber 180 and the warm air communication hole 132 and is mixed with warm air flowing the warm air passageway P2. After that, the mixed air is discharged to the inside of the vehicle so as to enhance the heating performance.

C. Exhaust Mode

As shown in FIG. 11, in the exhaust mode, the door 160 closes the outlet 130b of the bypass passageway 130 so as to communicate the rear side warm air passageway P2 of the heater 102 with the regeneration passageway 140, and the temperature-adjusting door 115 opens all of the cold air passageway P1 and the warm air passageway P2.

The exhaust mode is a mode to ventilate the inside air or to dry the evaporator 101. It is preferable that the evaporator 101 and the heater 102 be all turned off and the desiccant rotor 120 be turned off by the motor.

Moreover, the air blowing device 170 is converted into the indoor air inflow mode, and the mode doors 116 closes all of the air outflow ports of the air-conditioning case 110 so as to prevent that the air blown through the air blowing device 170 flows to the inside of the vehicle again.

Therefore, the air blown by the air blowing device 170 passes through the desiccant part 121 of the desiccant rotor 120 while flowing in the desiccant part area 110a of the air-conditioning case 110 after being introduced into the air-conditioning case 110.

Continuously, the air passing through the desiccant rotor 120 dries the evaporator 101 while passing through the evaporator 101, and then, passes through the heater 102 in the cold air passageway P1 and the warm air passageway P2 opened by the temperature-adjusting door 115.

After that, the air is introduced into the regeneration passageway 140 through the warm air communication hole 132 and the communication chamber 180 and is supplied to the regeneration part 122 of the desiccant rotor 120. After that, the air passing through the regeneration part 122 of the desiccant rotor 120 is discharged out through the discharge passageway 150.

As described above, in the exhaust mode, the air conditioner forcedly discharges the indoor air of the vehicle to the outside so as to ventilate the inside of the vehicle and dries the evaporator 101 so as to provide a pleasant indoor environment of the vehicle.

What is claimed is:

1. An air conditioner for a vehicle comprising:
an air blowing device;
an air-conditioning case having an air inflow port formed on one side for introducing the air blown from the air blowing device into the air-conditioning case, a plurality of air outflow ports formed on the other side for discharging out air, a cold air passageway which is formed between the air inflow port and the air outflow ports and in which an evaporator is mounted, and a warm air passageway in which a heater is mounted;
a desiccant rotor mounted at the upstream side of the evaporator in an air flow direction inside the air-conditioning case, one side of the desiccant rotor relative to the air-conditioning case being used as a desiccant part for dehumidifying the air flowing inside the air-conditioning case, the other side of the desiccant rotor being used as a regeneration part for drying and regenerating moisture absorbed at the desiccant part;
a bypass passageway and a regeneration passageway formed below the cold air passageway and the warm air passageway inside the air-conditioning case, the bypass passageway being adapted to let some of the air passing through the desiccant part of the desiccant rotor bypass the cold air passageway and the warm air passageway, the regeneration passageway being adapted to supply the air passing through the bypass passageway to the regeneration part of the desiccant rotor;
a communication chamber formed at an outlet of the bypass passageway inside the air-conditioning case for communicating the rear side warm air passageway of the heater, the bypass passageway and the regeneration passageway with one another, and
a door mounted inside the communication chamber for selectively opening and closing the rear side warm air passageway of the heater, the bypass passageway and the regeneration passageway relative to the communication chamber,
wherein the heater has one side area arranged on the bypass passageway and the other side area arranged on the warm air passageway in order to heat the air flowing the bypass passageway and the warm air passageway, and heats the dehumidified air passing the bypass passageway through the desiccant part of the desiccant rotor, and then, supplies the heated air to the regeneration part of the desiccant rotor so as to regenerate the desiccant rotor.

2. The air conditioner according to claim 1, further comprising:
a discharge passageway formed between the bypass passageway and the regeneration passageway for discharging out the air passing through the regeneration part of the desiccant rotor through the regeneration passageway.

3. The air conditioner according to claim 2, wherein a drain part for discharging out condensate water generated from the evaporator is formed below the evaporator inside the air-conditioning case, and
wherein an outlet of the discharge passageway is adjacent to the drain part.

4. The air conditioner according to claim 3, wherein the drain part penetrates through the bypass passageway, the discharge passageway and the regeneration passageway and extends in the downward direction of the air-conditioning case, and
wherein the outlet of the discharge passageway penetrates through the regeneration passageway and extends in the same direction as the drain part.

5. The air conditioner according to claim 1, wherein a warm air communication hole is formed on a partition wall between the rear side warm air passageway of the heater and the communication chamber,
wherein a regeneration communication hole is formed on a partition wall which partitions the bypass passageway and the regeneration passageway for communicating an inlet of the regeneration passageway with the outlet of the bypass passageway, and
wherein the door is mounted inside the communication chamber which is adjacent to the outlet of the bypass passageway for selectively opening and closing the warm air communication hole and the regeneration communication hole.

6. The air conditioner according to claim 1, wherein a warm air communication hole is formed on a partition wall between the rear side warm air passageway of the heater and the communication chamber, and
wherein the door comprises: a thin film member slidably mounted inside the communication chamber for selectively opening and closing the warm air communication hole, the outlet of the bypass passageway and the inlet of the regeneration passageway according to a sliding position; and a gear part rotatably mounted inside the communication chamber and engaged with one side of the thin film member so as to operate the thin film member.

7. The air conditioner according to claim 1, wherein mode doors are mounted inside the air-conditioning case for opening and closing the plural air outflow ports, and
wherein the air-conditioning mode comprises:
a regeneration mode that the door is operated to communicate the bypass passageway and the regeneration passageway with each other, such that the air passing through the bypass passageway flows toward the regeneration passageway;
a heating mode that the door is operated to communicate the bypass passageway and the rear side warm air passageway of the heater with each other, such that the air passing through the bypass passageway flows toward the rear side warm air passageway of the heater; and
an exhaust mode that the door is operated to communicate the rear side warm air passageway of the heater and the regeneration passageway with each other and closes all of the air outflow ports, such that the air passing through the cold air and warm air passageways flows toward the regeneration passageway.

8. The air conditioner according to claim 1, wherein the inlet of the regeneration passageway is communicated with the communication chamber, and the outlet is communicated with the front side of the regeneration part of the desiccant rotor.

9. The air conditioner according to claim 1, further comprising:
a motor mounted inside the air-conditioning case for rotatably operating the desiccant rotor; and
a control part for variably controlling RPM of the desiccant rotor by controlling the motor according to an air volume blown from the air blowing device.

10. The air conditioner according to claim 1, wherein the heater is a heater core in which cooling water for a vehicle engine flows.

11. The air conditioner according to claim 1, wherein the heater is an electric heater heated by receiving electric power from a battery of the vehicle.

12. The air conditioner according to claim 10, wherein the heater separately controls ON-OFF modes of the one side area arranged on the bypass passageway and the other side area arranged on the warm air passageway.

13. The air conditioner according to claim 1, wherein the one side area arranged on the bypass passageway is smaller than the other side area of the heater arranged on the warm air passageway.

14. The air conditioner according to claim 1, wherein the partition walls are respectively formed at front and rear sides of the desiccant rotor of the air-conditioning case for partitioning the inside of the air-conditioning case into a desiccant part area and a regeneration part area relative to the desiccant rotor.

* * * * *